(12) United States Patent
Chang et al.

(10) Patent No.: US 9,967,516 B2
(45) Date of Patent: May 8, 2018

(54) STEREO MATCHING METHOD AND DEVICE FOR PERFORMING THE METHOD

(71) Applicant: ELECTRONICS AND TELECOMMUNICATIONS RESEARCH INSTITUTE, Daejeon (KR)

(72) Inventors: Ji Ho Chang, Daejeon (KR); Jae Chan Jeong, Daejeon (KR); Ho Chul Shin, Daejeon (KR); Dae Hwan Hwang, Daejeon (KR); Seung Min Choi, Daejeon (KR); Eul Gyoon Lim, Daejeon (KR); Jae Il Cho, Daejeon (KR); Kuk Jin Yoon, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 351 days.

(21) Appl. No.: 14/811,070

(22) Filed: Jul. 28, 2015

(65) Prior Publication Data
US 2016/0037121 A1 Feb. 4, 2016

(30) Foreign Application Priority Data
Jul. 31, 2014 (KR) ......................... 10-2014-0098192

(51) Int. Cl.
*H04N 5/911* (2006.01)
*H04N 13/02* (2006.01)
(Continued)

(52) U.S. Cl.
CPC ............. *H04N 5/911* (2013.01); *G06T 7/521* (2017.01); *G06T 7/593* (2017.01);
(Continued)

(58) Field of Classification Search
CPC . H04N 5/911; H04N 13/0296; H04N 13/0239
See application file for complete search history.

(56) References Cited

U.S. PATENT DOCUMENTS 7,970,177 B2  6/2011 St. Hilaire et al.
8,249,333 B2  8/2012 Agarwal et al.
(Continued)

FOREIGN PATENT DOCUMENTS

KR  10-1133520 B1  4/2012
KR  10-2012-0089921 A  8/2012

OTHER PUBLICATIONS

Jae-Chan Jeong et al., "High-Quality Stereo Depth Map Generation Using Infrared Pattern Projection", ETRI Journal, Dec. 2013, pp. 1011-1020, vol. 35, No. 6, ETRI.

*Primary Examiner* — Ruiping Li (57) ABSTRACT

There are provided a stereo matching method capable of increasing a resolution and precision of an object and a device for performing the method. The method includes investigating a pattern according to a predetermined period; obtaining left and right stereo images in which the investigated pattern is included or not included; determining whether each of the stereo image obtained according to the predetermined period and a buffering image that is a previous frame image of the stereo image includes the pattern; and generating a final cost volume by performing different image processing according to whether each of the stereo image and the buffering image includes the pattern. Therefore, it is possible to increase precision of a disparity of a thin object and increase accuracy and precision of an object at a long distance.

14 Claims, 10 Drawing Sheets

(51) Int. Cl.
  *G06T 7/521* (2017.01)
  *G06T 7/593* (2017.01)
  *H04N 13/00* (2018.01)

(52) U.S. Cl.
  CPC ..... *H04N 13/0239* (2013.01); *H04N 13/0253* (2013.01); *G06T 2207/10012* (2013.01); *G06T 2207/10152* (2013.01); *H04N 2013/0081* (2013.01)

(56) References Cited

U.S. PATENT DOCUMENTS

2011/0032341 A1* 2/2011 Ignatov .............. H04N 13/0033 348/51
2012/0056982 A1 3/2012 Katz et al.
2015/0302596 A1* 10/2015 Mizukami ............. G06T 7/0075 382/154

* cited by examiner

STEREO MATCHING METHOD AND DEVICE FOR PERFORMING THE METHOD

CLAIM FOR PRIORITY

This application claims priority to Korean Patent Application No. 2014-0098192 filed on Jul. 31, 2014 in the Korean Intellectual Property Office (KIPO), the entire contents of which are hereby incorporated by reference.

BACKGROUND

1. Technical Field

Example embodiments of the present invention relate to stereo matching technology, and more specifically, to a stereo matching method capable of increasing a resolution and precision of an object at a long distance and a device for performing the method.

2. Related Art

Research in which various sensors are used to detect 3D information on a human and a space, and the detected 3D information is used for an application such as detection of a user's gesture or 3D modeling of a surrounding space is under progress.

In particular, research in which a human's gesture is detected, and the detected gesture of the human is linked as a control command for a device and is used as an input device such as a keyboard, a remote controller and a mouse is underway. According to active research, a 3D recognition method using an active light source that was used for factory automation or military has also been introducing.

In the related art, there was a technique in which a laser pattern of class 1 that is safe for the human was projected and disparity information for each distance that occurs between a projector and a camera was determined in real time.

In such a technique, 3D depth information was output at a resolution of about 640×480, but there is a problem in that it was difficult to increase a resolution due to a limitation of a semiconductor process in connection with a density of a structured light pattern. That is, it is difficult to distinguish a human's finger at 3 m away at such a resolution.

In addition, in the related art, since a density of an observed pattern and the result have a very close relation, there was a problem in that errors of the depth result of an object having a size of a finger at 1.5 m or more away increased, that is, precision decreased. Such a phenomenon is caused by a decreased density of a pattern formed at the finger and an area around the finger even when an IR camera accurately imaged the finger.

SUMMARY

In view of the above-described problems, example embodiments of the present invention provide a stereo matching method capable of increasing a resolution and precision of an object.

Example embodiments of the present invention also provide a stereo matching device capable of increasing a resolution and precision of an object.

In some example embodiments, a stereo matching method includes, detecting a pattern according to a predetermined period; obtaining left and right stereo images in which the detected pattern is included or not included; determining whether each of the stereo image (n-th frame, n is a natural number of 1 or more) obtained according to the predetermined period and a buffering image (n−1-th frame) that is a previous frame image of the stereo image includes the pattern; and generating a final cost volume by performing different image processing according to whether each of the stereo image and the buffering image includes the pattern.

The obtaining of the left and right stereo images may include obtaining left and right stereo images in which the detected pattern is included or not included; and preprocessing the obtained stereo image using at least one of rectification and noise reduction.

The stereo matching method may further include, after the generating of the final cost volume, selecting a disparity having the smallest cost within the final cost volume; and removing noise of the selected disparity.

The generating of the final cost volume may include generating a raw cost volume by performing raw cost computation on an image that is determined as having the pattern; generating a weight using an image determined as having no pattern; and generating a final cost volume by performing a vector product of the generated raw cost volume and the generated weight.

In the generating of the raw cost volume, the raw cost volume may be generated by performing raw cost computation using at least one of an absolute difference, census transform and a hamming distance.

In the generating of the weight using an image determined as having no pattern, the weight may be generated by applying at least one of an adaptive support weight, a guided filter and an edge preserving filter to the image determined as having no pattern.

The generating of the final cost volume may include blending an image determined as having the pattern and an image determined as having no pattern; generating a raw cost volume by performing raw cost computation on the blended image; generating a weight using the image determined as having no pattern; and generating a final cost volume by performing a vector product of the generated raw cost volume and the generated weight.

The generating of the final cost volume may include generating a first raw cost volume by performing raw cost computation on the stereo image; generating a second raw cost volume by performing raw cost computation on the buffering image; generating a third raw cost volume by blending the first raw cost volume and the second raw cost volume; generating a weight using an image determined as having no pattern; and generating a final cost volume by performing a vector product of the generated third raw cost volume and the generated weight.

In other example embodiments, a stereo matching device includes an image obtaining unit configured to obtain left and right stereo images in which a pattern is detected according to a predetermined period; a pattern determining unit configured to determine whether each of the stereo image (n-th frame, n is a natural number of 1 or more) obtained according to the predetermined period and a buffering image (n−1-th frame) that is a previous frame image of the stereo image includes the pattern; and a cost volume generating unit configured to generate a final cost volume by performing different image processing according to whether each of the stereo image and the buffering image includes the pattern.

The stereo matching device may further include a preprocessing unit configured to perform preprocessing on the obtained stereo image using at least one of rectification and noise reduction.

The stereo matching device may further include a raw cost computing unit configured to generate a raw cost volume by performing raw cost computation; a weight generating unit configured to generate a weight using an image determined as having no pattern; a cost volume generating unit configured to generate a final cost volume by performing a vector product of the generated raw cost volume and the generated weight; a disparity selecting unit configured to select a disparity having the smallest cost within the final cost volume; and a noise removing unit configured to remove noise of the selected disparity.

The raw cost computing unit may generate a raw cost volume by performing raw cost computation on an image determined as having the pattern.

The raw cost computing unit may blend an image determined as having the pattern and an image determined as having no pattern and generate the raw cost volume by performing raw cost computation on the blended image.

The raw cost computing unit may generate a first raw cost volume by performing raw cost computation on the stereo image, generate a second raw cost volume by performing raw cost computation on the buffering image, and then generate a third raw cost volume by blending the first raw cost volume and the second raw cost volume.

The raw cost computing unit may generate the raw cost volume by performing raw cost computation using at least one of an absolute difference, census transform, and a hamming distance.

The weight generating unit may generate a weight by applying at least one of an adaptive support weight, a guided filter and an edge preserving filter to the image determined as having no pattern.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

While the invention can be modified in various ways and take on various alternative forms, specific embodiments thereof are shown in the drawings and described in detail below as examples.

There is no intent to limit the invention to the particular forms disclosed. On the contrary, the invention is to cover all modifications, equivalents, and alternatives falling within the spirit and scope of the appended claims.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the invention will be described in detail with reference to the accompanying drawings. In order to facilitate overall understanding of the invention, like reference numerals in the drawings denote like elements, and thus the description thereof will not be repeated.

Figure 1:
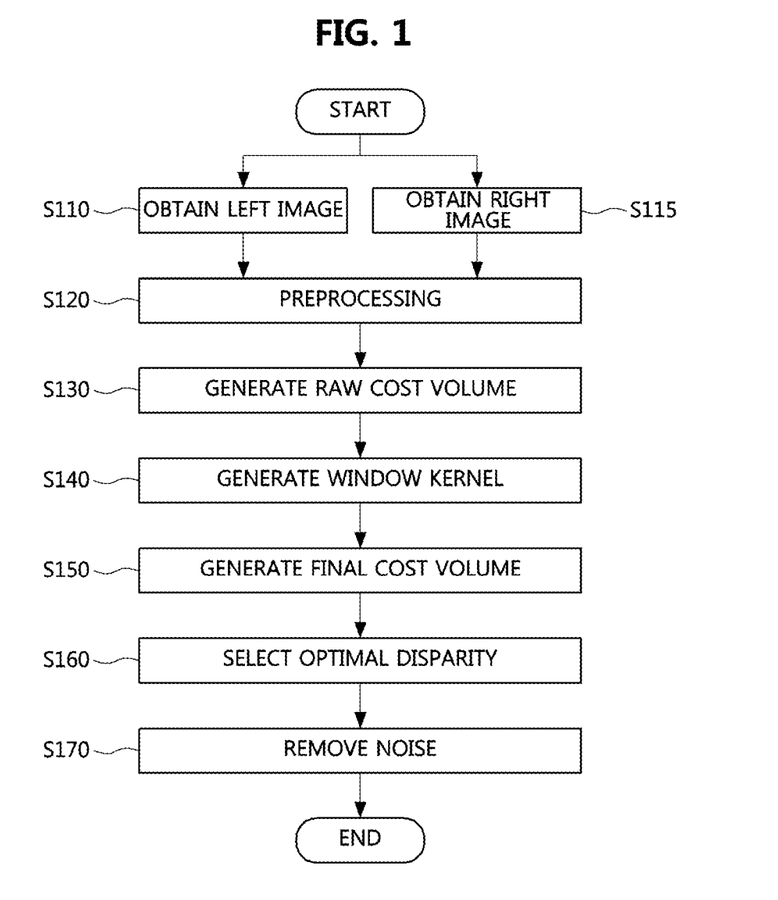
FIG. 1 is a flowchart illustrating a general stereo matching method.

FIG. 1 is a flowchart illustrating a general stereo matching method.

As illustrated in FIG. 1, when stereo images are input (S110 and S115) from two cameras, a stereo matching device performs preprocessing of aligning epipolar lines by performing noise reduction and rectification on the images (S120).

Then, the stereo matching device obtains a raw cost volume that is possible to a maximum disparity by setting one of the input left and right images as a reference image and horizontally moving the other image (a target image) along epipolar lines, using various methods (S130).

Here, the various methods may include, for example, an absolute difference, census transform, and a hamming distance.

However, a raw cost obtained in operation 130 has a problem in that it is difficult to determine whether left and right images match since it generally has information on one pixel.

In order to improve such problems, the stereo matching device may form a window kernel using a method of simply summing all values in a window or by generating various windows using image information and using a guided filter, an edge preserving filter, an adaptive support weight that enables each cost to have a different weight, and the like as a method of aggregating raw cost values in surrounding pixels (S140).

The stereo matching device forms a final cost volume by obtaining a vector product of the weight of each pixel position obtained in operation 140 and the cost obtained in operation 130 (S150).

Then, the stereo matching device selects a disparity that has the smallest cost within the final cost volume (S160). This is a method of finding a point at the reference image that is the most similar to a point at the other image (the target image).

The stereo matching device performs a task of removing noises and increasing reliability of the disparity obtained in operation 160 using various methods (S170).

In recent stereo matching, there is a great difference in results according to a method of forming the window kernel in operation 140.

For example, in a method of using a square window kernel that was frequently used, as a size of the window increases, accuracy at one point increases, but there is a phenomenon in which a disparity image is generally blurred.

In order to prevent such a phenomenon, in the adaptive support weight, the guided filter and the like, a window kernel was generated using a method in which costs of the same color ranges are summed.

However, in a method of projecting an active pattern, the window kernel is influenced due to the pattern and represented in the form of a random dot. Accordingly, performance of stereo matching decreases.

Hereinafter, in order to address the above-described problems, a stereo matching method according to an embodiment of the present invention will be described with reference to the accompanying drawings.

Figure 2:
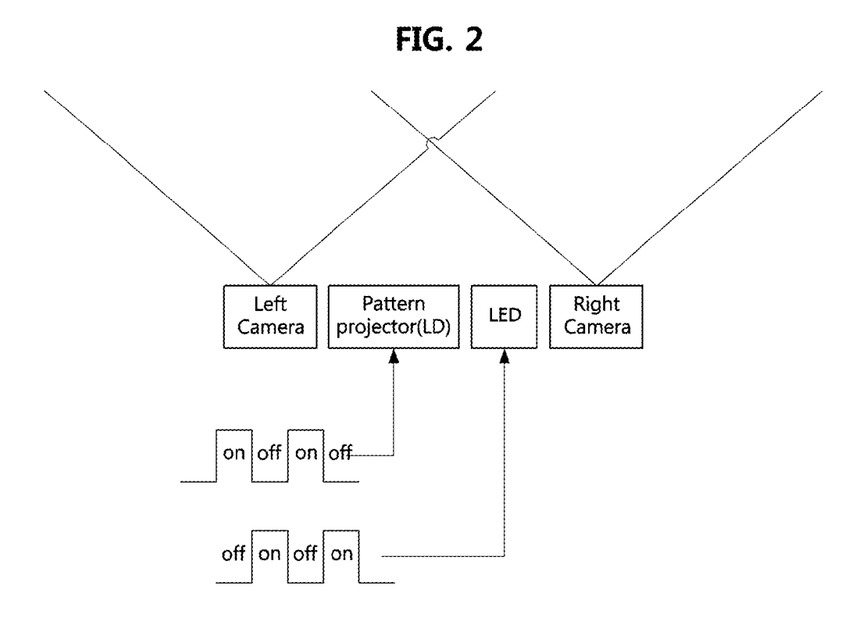
FIG. 2 is a conceptual diagram illustrating a configuration of a system to which a stereo matching method according to an embodiment of the present invention is applied.
Figure 3:
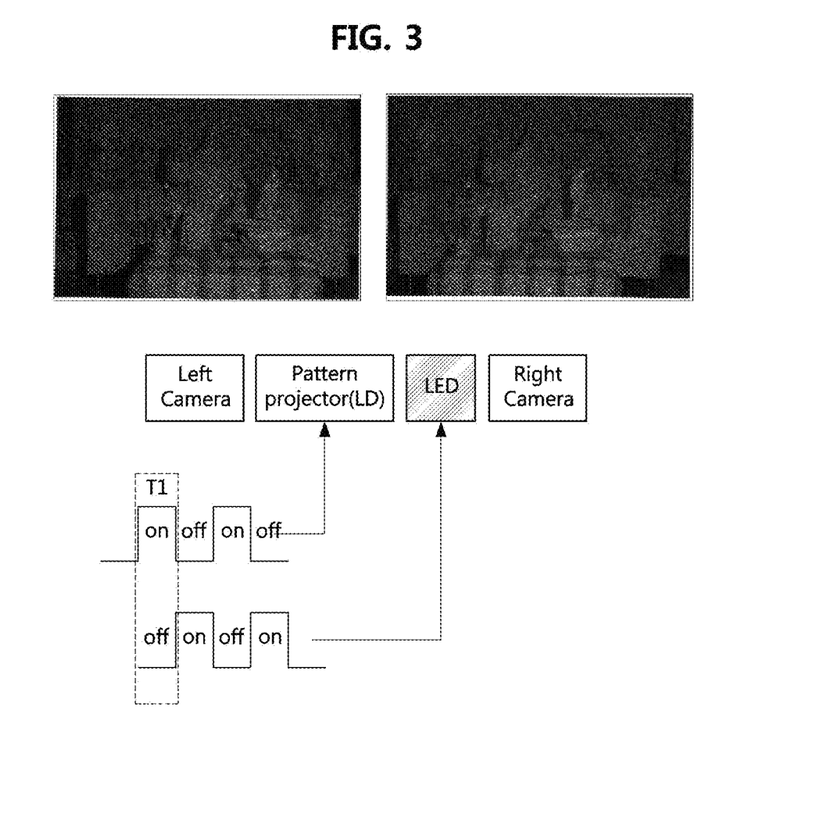
FIG. 3 is a conceptual diagram illustrating an operation at T1 and resulting input images.
Figure 4:
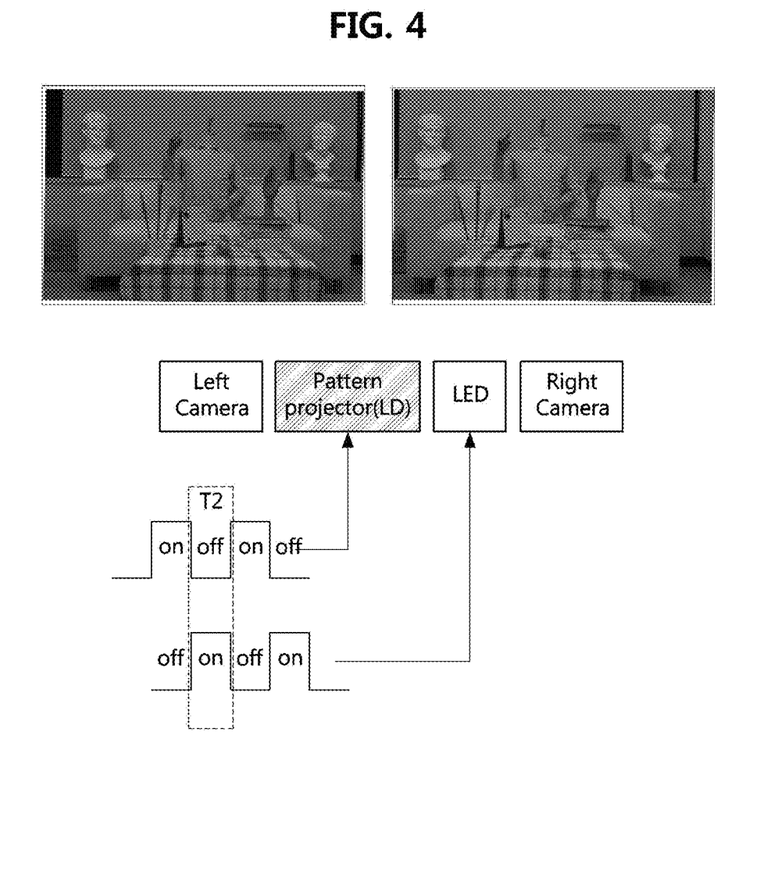
FIG. 4 is a conceptual diagram illustrating an operation at T2 and resulting input images.

FIG. 2 is a conceptual diagram illustrating a configuration of a system to which a stereo matching method according to an embodiment of the present invention is applied. FIG. 3 is a conceptual diagram illustrating an operation at T1 and resulting input images. FIG. 4 is a conceptual diagram illustrating an operation at T2 and resulting input images.

As illustrated in FIGS. 2 to 4, a system to which the stereo matching method according to the embodiment of the present invention is applied includes two cameras for active stereo matching of a structured light method, at least one pattern projector (LD), an LED emitter necessary for ensuring a light amount when the edge preserving filter is used, and a modulation device configured to turn the pattern projector or the LED emitter on or off using a synchronization signal of the camera and other external signal.

Here, when the camera is able to ensure a sufficient light amount, the LED emitter may not be used.

The system may perform the edge preserving filter using the pattern projector (LD) such that it is set as T1 when the pattern projector (LD) is turned on and the LED emitter is turned off and it is set as T2 when the pattern projector (LD) is turned off and the LED emitter is turned on.

Figure 5:
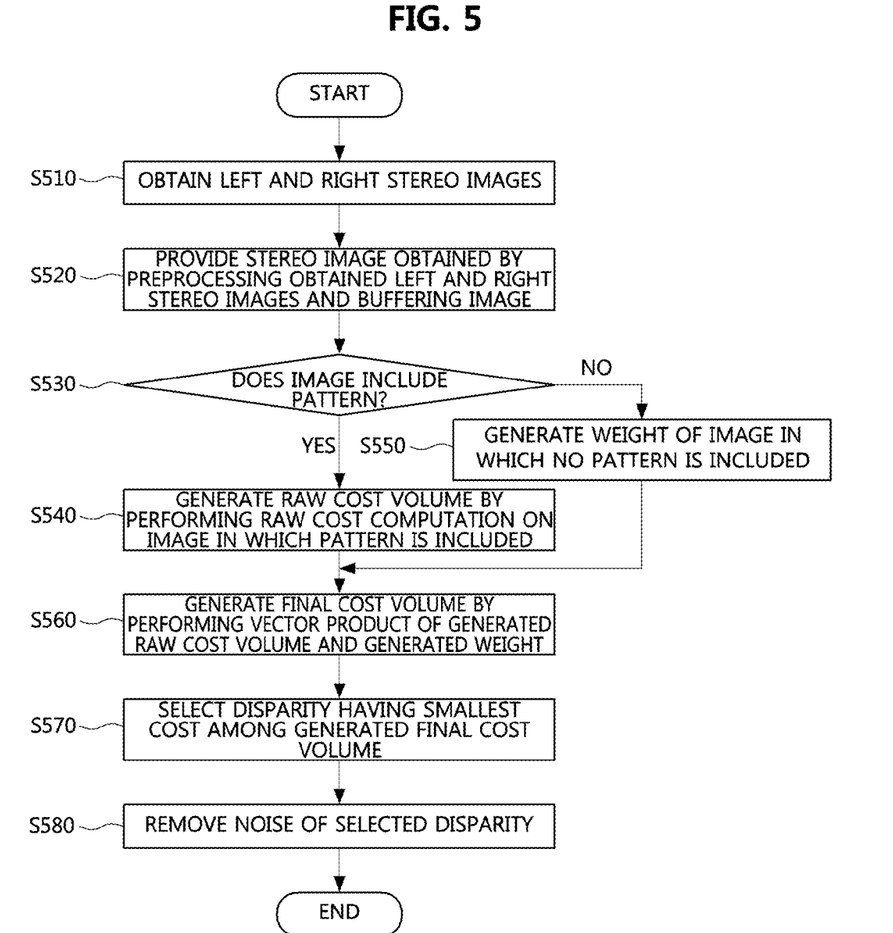
FIG. 5 is a flowchart illustrating a stereo matching method according to an embodiment of the present invention.

FIG. 5 is a flowchart illustrating a stereo matching method according to an embodiment of the present invention.

As illustrated in FIG. 5, a device for performing the stereo matching method (hereinafter referred to as a "stereo matching device") according to the embodiment of the present invention obtains left and right stereo images from left and right stereo cameras (S510).

Here, the obtained left and right stereo images may be an image in which a pattern is detected according to a predetermined period or an image in which the detected pattern is included or not included.

The stereo matching device obtains a stereo image (n-th frame, n is a natural number of 1 or more) that is obtained by preprocessing the left and right stereo images obtained in operation 510 and a buffering image (n−1-th frame) that is a previous frame image of the stereo image (S520).

The stereo matching device determines whether each of the stereo image and the buffering image obtained according to the predetermined period in operation 520 includes the pattern (S530).

Here, the stereo matching device may perform operation 530 by receiving on and off signals of the pattern projector from an active projector that is synchronized with the camera and repeats on or off for each frame using a method in which one frame projects a pattern and the next frame does not project a pattern.

The stereo matching device generates a raw cost volume by performing raw cost computation on an image that is determined as having the pattern within the stereo image and the buffering image obtained in operation 530 (S540).

Here, the stereo matching device may generate a raw cost volume of an image that is determined as having the pattern using an absolute difference, census transform, a hamming distance and the like.

In addition, the stereo matching device generates a weight using an image that is determined as having no pattern within the stereo image and the buffering image obtained in operation 530 (S550).

Specifically, the stereo matching device may generate a weight by applying the adaptive support weight, the guided filter, the edge preserving filter, and the like to the image that is determined as having no pattern.

Then, the stereo matching device generates a final cost volume by performing a vector product of the raw cost volume and the weight generated in operation 540 and operation 550, respectively (S560).

The stereo matching device selects a disparity having the smallest cost within the final cost volume generated in operation 560 (S570).

Then, the stereo matching device removes noise of the disparity selected in operation 570 (S580).

In the stereo matching method according to the embodiment of the present invention, the pattern projector is synchronized with the camera and performs projection sequentially, and accordingly it is able to apply a technique such as the adaptive support weight, the guided filter, the edge preserving filter to the image in which no pattern is included. Therefore, it is possible to increase precision of a disparity of a thin object.

Figure 6:
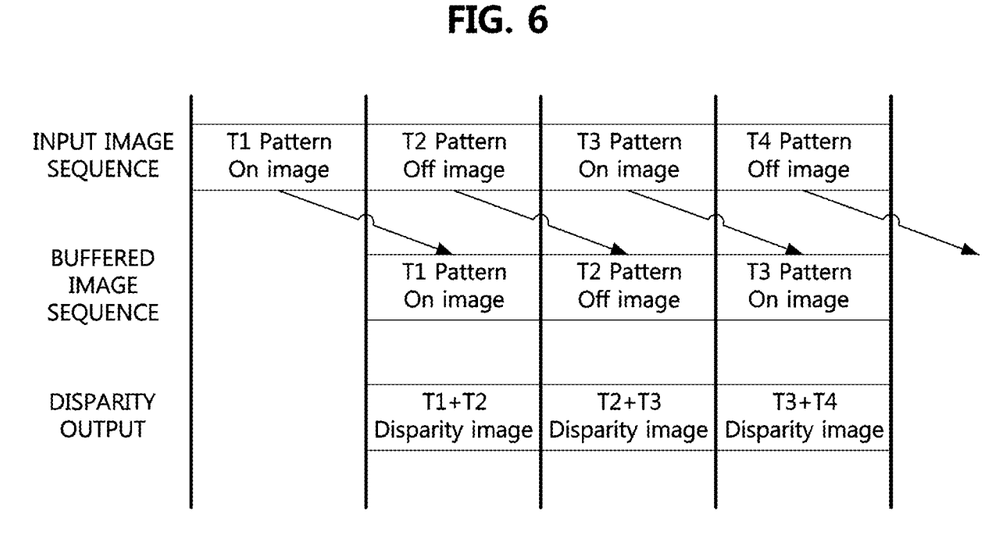
FIG. 6 is a conceptual diagram illustrating a relation between an entering input image and an output according to a time axis.

FIG. 6 is a conceptual diagram illustrating a relation between an entering input image and an output according to a time axis.

As illustrated in FIG. 6, an image frame in which a pattern is included and an image frame in which no pattern is included are alternately input over time.

One frame is buffered, and then an image T1 in which a pattern is included is input along with an image T2 in which no pattern is included in the next frame.

Then, as illustrated in FIG. 5, a raw cost volume is generated using the image T1 in which the pattern is included and a weight is generated using the image T2 in which no pattern is included.

Also, it can be understood that a disparity output maintains a frame per second (fps) that is the same as in the input image.

Figure 7:
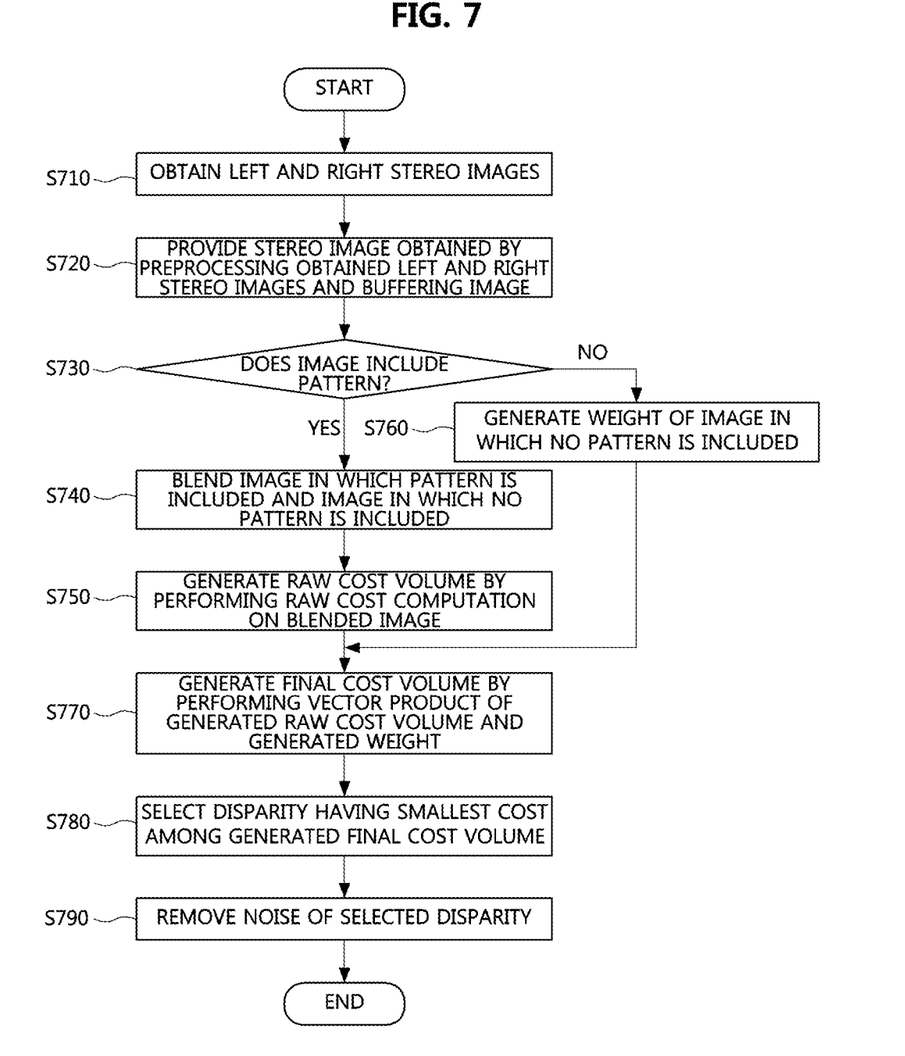
FIG. 7 is a flowchart illustrating a stereo matching method according to another embodiment of the present invention.

FIG. 7 is a flowchart illustrating a stereo matching method according to another embodiment of the present invention.

As illustrated in FIG. 7, the stereo matching device obtains left and right stereo images from left and right stereo cameras (S710).

Here, the obtained left and right stereo images may be an image in which a pattern is detected according to a predetermined period or an image in which the detected pattern is included or not included.

The stereo matching device obtains a stereo image (n-th frame, n is a natural number of 1 or more) that is obtained by preprocessing the left and right stereo images obtained in operation 710 and a buffering image (n−1-th image) that is a previous frame image of the stereo image (S720).

The stereo matching device determines whether each of the stereo image and the buffering image obtained according to the predetermined period in operation 720 includes the pattern (S730).

Here, the stereo matching device may perform operation 730 by receiving on and off signals of the pattern projector from an active projector that is synchronized with the camera and repeats on or off for each frame using a method in which one frame projects a pattern and the next frame does not project a pattern Then, the stereo matching device blends the image in which the pattern is included and the image in which no pattern is included (S740).

Here, the blending of the images in operation 740 may be performed by alpha blending or any algorithm of a similar type.

The stereo matching device generates a raw cost volume by performing raw cost computation on the image blended in operation 740 (S750).

Here, the image in which the pattern is included has a disadvantage in that an error rate is high in a section in which the pattern is invisible and the image in which no pattern is included has a disadvantage in that an error rate is high in a section in which there is almost no texture. Therefore, in order to compensate for such disadvantages, the stereo matching device may generate a raw cost volume by performing raw cost computation on the image in which the image in which the pattern is included and the image in which no pattern is included are blended in operation 750.

Alternatively, the stereo matching device generates a weight using an image that is determined as having no pattern within the stereo image and the buffering image obtained in operation 730 (S760).

Specifically, the stereo matching device may generate a weight by applying the adaptive support weight, the guided filter, the edge preserving filter, and the like to the image determined as having no pattern.

Then, the stereo matching device generates a final cost volume by performing a vector product of the raw cost volume and the weight generated in operation 750 and operation 760, respectively (S770).

The stereo matching device selects a disparity having the smallest cost within the final cost volume generated in operation 770 (S780), and removes noise of the selected disparity (S790).

In the stereo matching method according to the embodiment of the present invention, it is possible to further increase precision of a disparity by performing raw cost computation by blending the image in which the pattern is included and the image in which no pattern is included.

Figure 8:
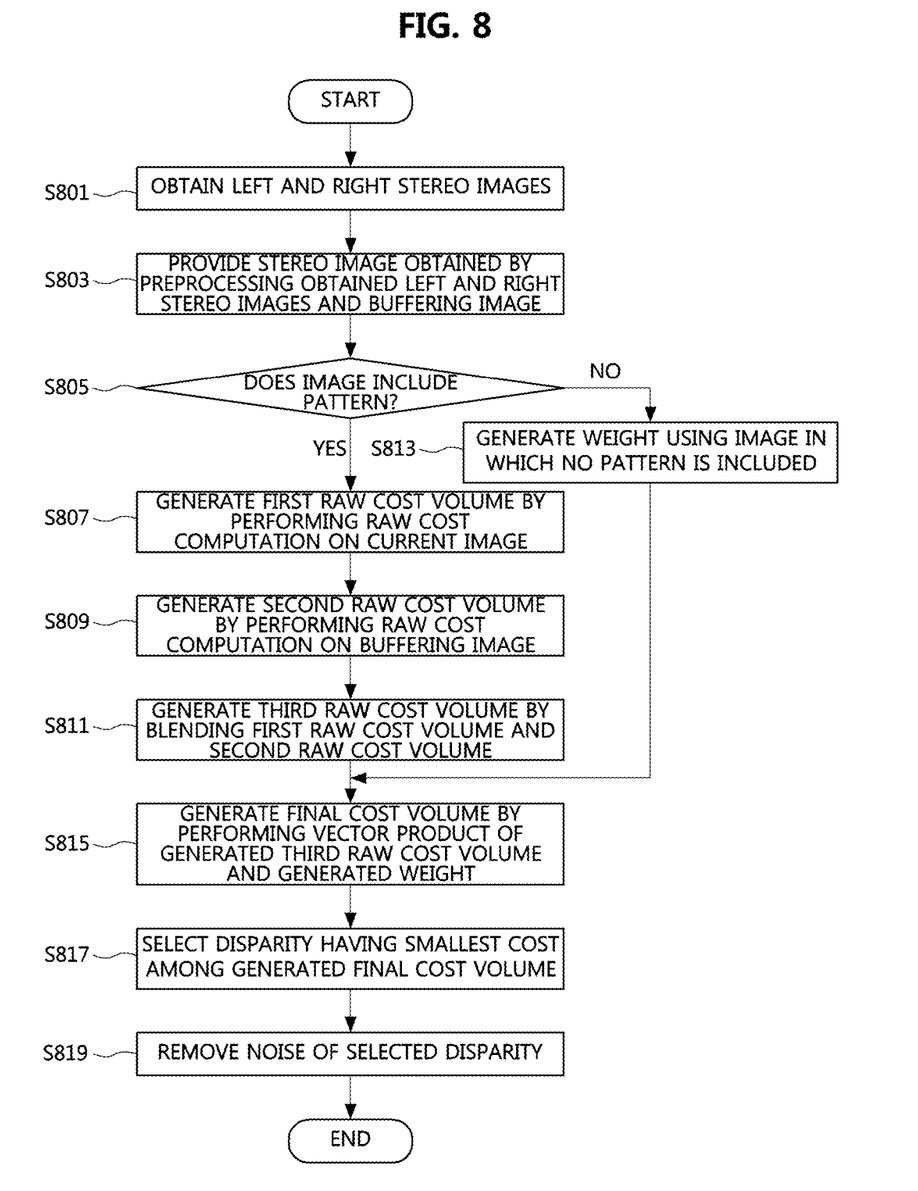
FIG. 8 is a flowchart illustrating a stereo matching method according to still another embodiment of the present invention.

FIG. 8 is a flowchart illustrating a stereo matching method according to still another embodiment of the present invention.

As illustrated in FIG. 8, the stereo matching device obtains left and right stereo images from left and right stereo cameras in which a pattern is detected according to a predetermined period (S801).

The stereo matching device obtains a stereo image that is obtained by preprocessing the left and right stereo images obtained in operation 801 and a buffering image that is a previous frame image of the stereo image (S803).

The stereo matching device determines whether each of the stereo image and the buffering image obtained according to the predetermined period in operation 803 includes the pattern (S805).

Then, the stereo matching device generates a first raw cost volume by performing raw cost computation on the stereo image (S807).

The stereo matching device generates a second raw cost volume by performing raw cost computation on the buffering image (S809).

Here, for convenience of description, in operation 807 and operation 809, the stereo matching device primarily performs the operation of generating a first raw cost volume by performing raw cost computation on the stereo image. However, operation 807 and operation 809 may be sequentially performed, reversely, or at the same.

Then, the stereo matching device generates a third raw cost volume by blending the first raw cost volume generated in operation 807 and the second raw cost volume generated in operation 809 (S811).

In addition, the stereo matching device generates a weight using an image that is determined as having no pattern in operation 805 (S813).

Specifically, the stereo matching device may generate a weight by applying the adaptive support weight, the guided filter, the edge preserving filter and the like to the image determined as having no pattern.

Then, the stereo matching device generates a final cost volume by performing a vector product of the third raw cost volume and the weight generated in operation 811 and operation 813, respectively (S815).

The stereo matching device selects a disparity having the smallest cost within the final cost volume generated in operation 815 (S817), and removes noise of the selected disparity (S819).

In the stereo matching method according to the embodiment of the present invention, a raw cost volume of each of the stereo image and the buffering image is obtained and then the raw cost volumes are blended. Therefore, it is possible to further increase precision of a disparity.

Hereinafter, the stereo matching device that performs the stereo matching method according to the embodiment of the present invention will be described with reference to the accompanying drawings.

Components to be described below are defined by a functional classification rather than a physical classification and may be defined by functions performed by each component. Each of the components may be implemented by hardware and/or a program code performing each function, and a processing unit, and functions of two or more components may be included in one component.

Therefore, a name given to the component in the embodiment is meant to imply a representative function performed by each component rather than to physically distinguish each component. It should be noted that the technological scope of the invention is not limited to the name of the component.

Figure 9:
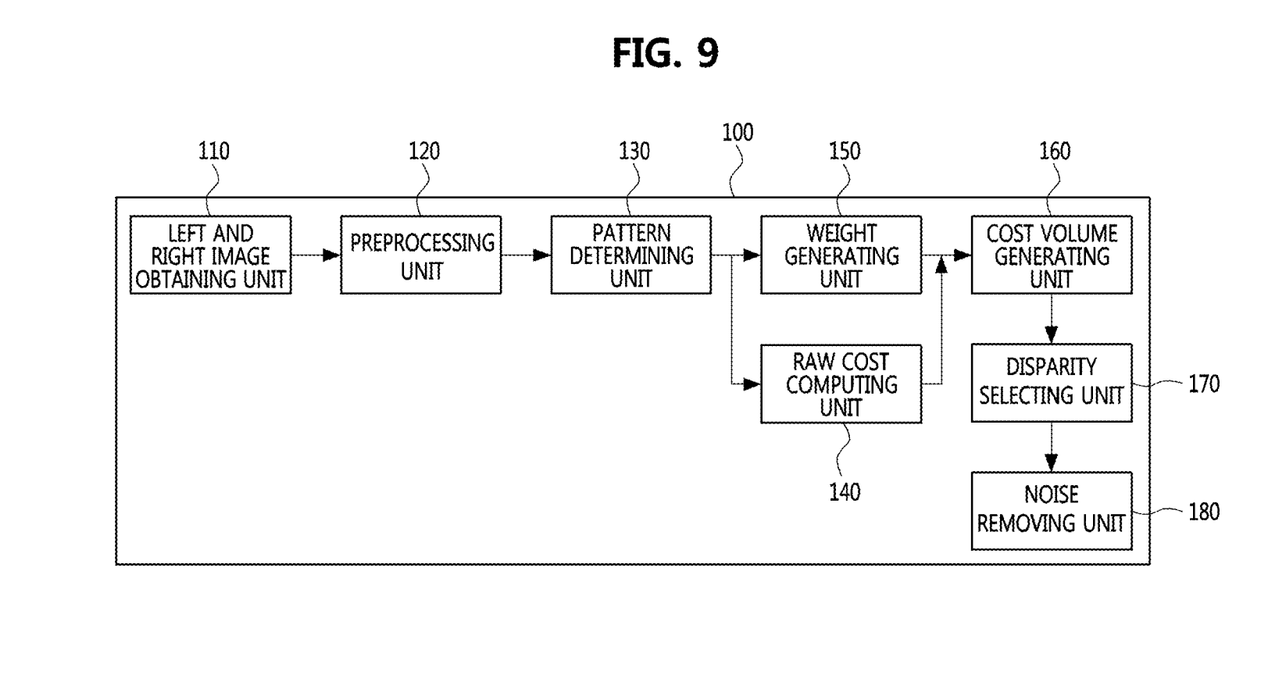
FIG. 9 is a block diagram illustrating an embodiment of a configuration of a stereo matching device according to an embodiment of the present invention.

FIG. 9 is a block diagram illustrating a configuration of a stereo matching device according to an embodiment of the present invention.

As illustrated in FIG. 9, a stereo matching device 100 according to an embodiment of the present invention may include a left and right image obtaining unit 110, a preprocessing unit 120, a pattern determining unit 130, a raw cost computing unit 140, weight generating unit 150, a cost volume generating unit 160, a disparity selecting unit 170 and a noise removing unit 180.

First, the left and right image obtaining unit 110 obtains left and right stereo images in which a pattern is detected according to a predetermined period from left and right stereo cameras and provides the images to the preprocessing unit 120.

The preprocessing unit obtains a stereo image (n-th frame) that is obtained by preprocessing the received left and right stereo images and a buffering image (n−1-th frame) that is a previous frame image of the stereo image, and provides the obtained stereo image and buffering image to the pattern determining unit 130.

The pattern determining unit 130 determines whether each of the received stereo image and buffering image includes the pattern according to the predetermined period.

Here, the pattern determining unit 130 determines whether each of the received stereo image and buffering image includes the pattern according to an on and off signal of the pattern projector that is received from the active projector.

The raw cost computing unit 140 generates a raw cost volume by performing raw cost computation on the image and provides the generated raw cost volume to the cost volume generating unit 160.

Specifically, the raw cost computing unit 140 may generate a raw cost volume by performing raw cost computation on the image that is determined as having the pattern within the stereo image and the buffering image, and provide the generated raw cost volume to the cost volume generating unit 160.

Here, the raw cost computing unit 140 may generate a raw cost volume of the blended image using an absolute difference, census transform, a hamming distance and the like.

Alternatively, the raw cost computing unit 140 may blend the image in which the pattern is included and the image in which no pattern is included, generate a raw cost volume by performing raw cost computation on the blended image, and then provide the generated raw cost volume to the cost volume generating unit 160.

Alternatively, the raw cost computing unit 140 may generate a first raw cost volume by performing raw cost computation on the stereo image, generate a second raw cost volume by performing raw cost computation on the buffering image, generate a third raw cost volume by blending the first raw cost volume and the second raw cost volume, and provide the generated third raw cost volume to the cost volume generating unit 160.

The weight generating unit 150 generates a weight using an image that is determined as having no pattern among the obtained stereo image and buffering image and provides the generated weight to the cost volume generating unit 160.

Specifically, the weight generating unit 150 may generate a weight by applying the adaptive support weight, the guided filter, the edge preserving filter and the like to the image determined as having no pattern.

The cost volume generating unit 160 generates a final cost volume by performing a vector product of the raw cost volume and the weight provided from the raw cost computing unit 140 and the weight generating unit 150, respectively, and provides the generated final cost volume to the disparity selecting unit 170.

The disparity selecting unit 170 selects a disparity having the smallest cost within the provided final cost volume and provides the selected disparity to the noise removing unit 180.

The noise removing unit 180 removes noise of the provided disparity.

According to the stereo matching device of the embodiment of the present invention, the pattern projector is synchronized with the camera and performs projection sequentially, and accordingly it is able to apply a technique such as the adaptive support weight, the guided filter and the edge preserving filter to an image in which no pattern is included. Therefore, it is possible to increase precision of a disparity of a thin object. Also, it is possible to further increase precision of a disparity using a blending technique.

According to the stereo matching method and the stereo matching device of the embodiment of the present invention, a stereo image that is obtained by preprocessing obtained left and right stereo images and a buffering image that is a previous frame image of the stereo image are obtained. Based on whether each of the obtained stereo image and buffering image includes a pattern, a raw cost volume and a weight are generated, and then a final cost volume is generated by performing a vector product of the generated raw cost volume and weight.

Therefore, since the edge preserving filter and the like can be used for an image in which no pattern is included while the active stereo matching technique is used, it is possible to increase precision of a disparity of a thin object such as a finger. Accordingly, it is possible to increase accuracy and precision of an object at a long distance. Also, it is possible to improve the result of the raw cost itself using various blending methods.

Figure 10:
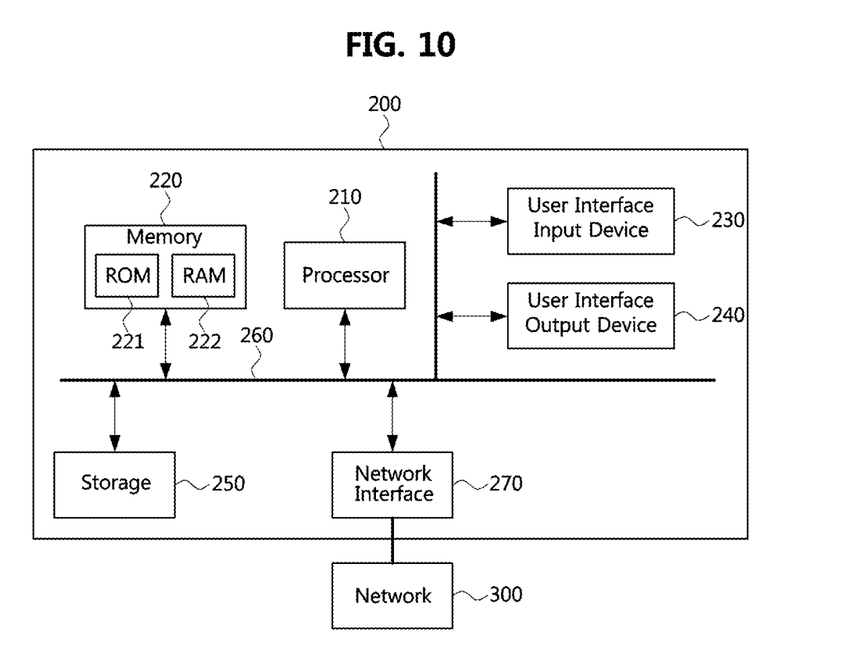
FIG. 10 is a block diagram illustrating other embodiment of a configuration of a stereo matching device according to and embodiment of the present invention.

FIG. 10 is a block diagram illustrating other embodiment of a configuration of a stereo matching device according to an embodiment of the present invention.

Referring to FIG. 10, the stereo matching device 200 may include one or more of a processor 210, a memory 220, a user interface input device 230, a user interface output device 240, and a storage 250, each of which communicates through a bus 260. The stereo matching device 200 may also include a network interface 270 that is coupled to a network 300. The processor 210 may be a central processing unit (CPU) or a semiconductor device that executes processing instructions stored in the memory 220 and/or the storage 250 may include various forms of volatile or non-volatile storage media. For example, the memory 220 may include a read-only memory (ROM) 221 and a random access memory (RAM) 222.

Accordingly, an embodiment of the present invention may be implemented as a computer implemented method or as a non-transitory computer readable medium with computer executable instructions stored thereon. In an embodiment, when executed by the processor, the computer readable instructions may perform a method according to at least one aspect of the present invention.

While the example embodiments of the present invention and their advantages have been described above in detail, it should be understood that various changes, substitutions and alterations may be made herein without departing from the scope of the invention as defined by the following claims.

[Reference Numerals]

| | |
|---|---|
| 100, 200: stereo matching device | 110: left and right image obtaining unit |
| 120: preprocessing unit | 130: pattern determining unit |
| 140: raw cost computing unit | 150: weight generating unit |
| 160: cost volume generating unit | 170: disparity selecting unit |
| 180: noise removing unit | 210: processor |
| 220: memory | 221: read-only memory |
| 222: random access memory | 230: user interface input device |
| 240: user interface output device | 250: storage |
| 260: bus | 270: network interface |
| 300: network | |

What is claimed is:

1. A stereo matching method performed by a stereo matching device including a processor, the method comprising:
    obtaining left and right stereo images;
    producing an $n^{th}$ frame using the left and right stereo images, n being a natural number greater than or equal to 1;
    determining whether each of the $n^{th}$ frame and a buffering frame that is an $n-1^{th}$ frame includes a pattern, the pattern corresponding to a predetermines period, wherein a frame includes the pattern if an image of the frame includes the pattern;
    when the $n^{th}$ frame includes the pattern and the buffering frame does not include the pattern, generating a raw cost volume using the $n^{th}$ frame and generating a weight using the buffering frame;
    when the buffering frame includes the pattern and the $n^{th}$ frame does not include the pattern, generating the raw cost volume using the buffering frame and generating the weight using the $n^{th}$ frame; and
    generating a final cost volume by performing the vector product of the raw cost volume and the weight.

2. The stereo matching method of claim 1,
    wherein obtaining of the left and right stereo images includes
    preprocessing the obtained stereo images using at least one of rectification and noise reduction.

3. The stereo matching method of claim 1, further comprising,
    after the generating of the final cost volume, selecting a disparity having the smallest cost within the final cost volume; and
    removing noise of the selected disparity.

4. The stereo matching method of claim 1,
    wherein the raw cost volume is generated by performing raw cost computation using at least one of an absolute difference, census transform, and a hamming distance.

5. The stereo matching method of claim 1,
    wherein
    the weight is generated by applying at least one of an adaptive support weight, a guided filter, and an edge preserving filter to the buffering frame when the buffering frame does not include the pattern, and to the $n^{th}$ frame when the $n^{th}$ frame does not include the pattern.

6. The stereo matching method of claim 1,
    further comprising:
    blending the $n^{th}$ frame and the buffering frame,
    wherein the
    raw cost volume is generated by performing raw cost computation on the blended frame.

7. The stereo matching method of claim 1, the raw cost volume being a first raw cost volume,
    wherein generating the final cost volume includes:
    generating a second raw cost volume by performing raw cost computation on the $n^{th}$ frame;
    generating a third raw cost volume by performing raw cost computation on the buffering frame; and
    generating the first raw cost volume by blending the first raw cost volume and the second raw cost volume.

8. A stereo matching device, comprising:
    an image obtaining unit configured to obtain left and right stereo images, and to produce an $n^{th}$ frame using the left and right stereo images, n being a natural number greater than or equal to 1;
    a pattern determining unit configured to determine whether each of the $n^{th}$ frame and a buffering frame includes a pattern, the buffering frame being an $n-1^{th}$ frame, the pattern corresponding to a predetermined period, a frame including the pattern when an image of the frame includes the pattern;
    a raw cost computing unit configured to:
        generate, when the $n^{th}$ frame includes the pattern and the buffering frame does not include the pattern, a raw cost volume using the $n^{th}$ frame, and
        generate, when the buffering frame includes the pattern and the $n^{th}$ frame does not include the pattern, the raw cost volume using the buffering frame;
    a weight generating unit configured to:
        generate, when the $n^{th}$ frame includes the pattern and the buffering frame does not include the pattern, a weight using the buffering frame, and
        generate, when the buffering frame includes the pattern and the $n^{th}$ frame does not include the pattern, the weight using the $n^{th}$ frame; and
    a cost volume generating unit configured to generate a final cost volume by performing a vector product of the raw cost volume and the weight.

9. The stereo matching device of claim 8, further comprising
    a preprocessing unit configured to perform preprocessing on the obtained stereo images using at least one of rectification and noise reduction.

10. The stereo matching device of claim 8, further comprising:
    a disparity selecting unit configured to select a disparity having the smallest cost within the final cost volume; and
    a noise removing unit configured to remove noise of the selected disparity.

11. The stereo matching device of claim 10,
    wherein the raw cost computing unit is configured to generate blend the $n^{th}$ frame and the buffering frame, and generates the raw cost volume by performing raw cost computation on the blended image.

12. The stereo matching device of claim 10, the raw cost volume being a first raw cost volume,
    wherein the raw cost computing unit generates a second raw cost volume by performing raw cost computation on the $n^{th}$ frame, generates a third raw cost volume by performing raw cost computation on the buffering frame, and then generates the first raw cost volume by blending the second raw cost volume and the third raw cost volume.

13. The stereo matching device of claim 10, wherein the raw cost computing unit generates the raw cost volume by performing raw cost computation using at least one of an absolute difference, census transform, and a hamming distance.

14. The stereo matching device of claim 10, wherein the weight generating unit generates the weight by applying at least one of an adaptive support weight, a guided filter and an edge preserving filter to the $n^{th}$ image when the $n^{th}$ image does not include the pattern, and to the buffering image when the buffering image does not include the pattern.

\* \* \* \* \*